US012695612B2

(12) United States Patent
Bober et al.

(10) Patent No.: US 12,695,612 B2
(45) Date of Patent: Jul. 28, 2026

(54) SECURING DATA SENT BETWEEN COMPUTING DEVICES

(71) Applicant: Dell Products L.P., Round Rock, TX (US)

(72) Inventors: Roman Bober, Ashdod (IL); Maxim Balin, Gan-Yavne (IL); Stav Sapir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 305 days.

(21) Appl. No.: 18/491,153

(22) Filed: Oct. 20, 2023

(65) Prior Publication Data

US 2025/0132913 A1 Apr. 24, 2025

(51) Int. Cl.
H04L 9/30 (2006.01)
G06F 21/62 (2013.01)

(52) U.S. Cl.
CPC ............ H04L 9/30 (2013.01); G06F 21/6245 (2013.01)

(58) Field of Classification Search
CPC ........ H04L 9/30; H04L 9/088; G06F 21/6245
See application file for complete search history.

(56) References Cited

U.S. PATENT DOCUMENTS 6,105,027 A * 8/2000 Schneider ............. H04L 63/102
707/999.009
6,128,735 A * 10/2000 Goldstein ............... H04L 9/088
713/166

10,223,543 B1 * 3/2019 Mohen ................ H04L 63/0428
2005/0251865 A1 * 11/2005 Mont ................... G06F 21/6245
726/26
2009/0210945 A1 * 8/2009 Kato ..................... G06F 12/1491
726/26
2014/0201526 A1 * 7/2014 Burgess ................ G06F 21/316
713/165
2014/0250534 A1 * 9/2014 Flores ................. G06F 21/6209
726/26
2016/0080332 A1 * 3/2016 Zömbik .............. H04L 63/0435
713/168
2017/0006064 A1 * 1/2017 Agarwal .............. H04L 9/3263
2017/0118221 A1 * 4/2017 Hannel ............... H04L 63/0471
2018/0020001 A1 * 1/2018 White ................... G06F 21/602
2022/0292221 A1 * 9/2022 Sohail ................... H04L 63/105
2023/0078179 A1 * 3/2023 Rahn ..................... H04L 9/0891
713/150
2024/0055125 A1 * 2/2024 Sinha ..................... A61B 5/721
2024/0223553 A1 * 7/2024 Vedula ................ H04L 63/0435

FOREIGN PATENT DOCUMENTS

CN 114201773 B * 12/2021 ........... G06F 16/253
CN 117556447 A * 11/2023 ........... G06F 16/253

* cited by examiner

*Primary Examiner* — Catherine Thiaw
*Assistant Examiner* — Nega Woldemariam
(74) *Attorney, Agent, or Firm* — WOMBLE BOND DICKINSON (US) LLP

(57) ABSTRACT

Methods and systems for securing data are disclosed. The data may be secured by encrypting the data. The data may be sent from one edge device to another edge device. To secure the transmission of the data between edge devices, the selection of an encryption algorithm to encrypt the data may be based on progressive rules and other attributes. The progressive rules may be determined by an edge orchestrator and send to all edge devices. The other attributes may include identifiers of the one edge device and the other edge device and classification of the data.

20 Claims, 6 Drawing Sheets

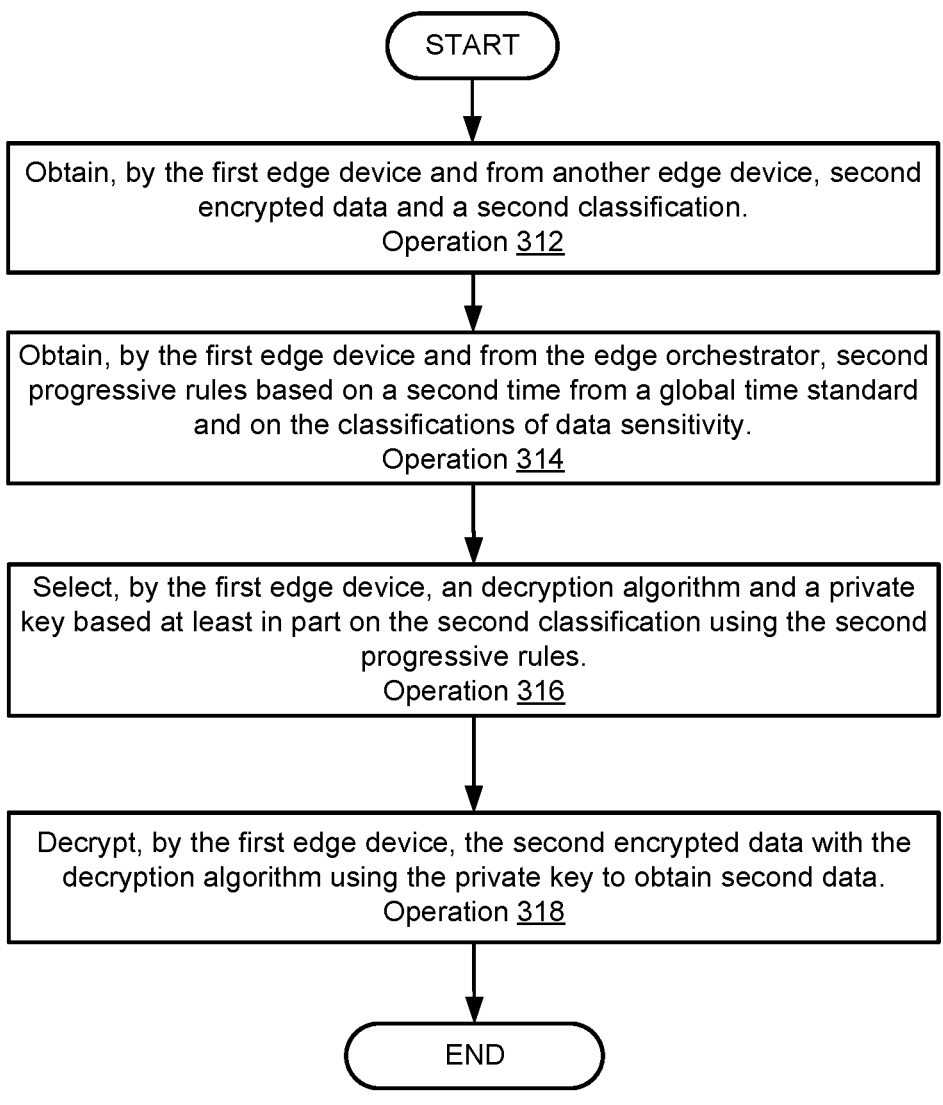

START

Obtain, by the first edge device and from another edge device, second
encrypted data and a second classification.
Operation 312

Obtain, by the first edge device and from the edge orchestrator, second
progressive rules based on a second time from a global time standard
and on the classifications of data sensitivity.
Operation 314

Select, by the first edge device, an decryption algorithm and a private
key based at least in part on the second classification using the second
progressive rules.
Operation 316

Decrypt, by the first edge device, the second encrypted data with the
decryption algorithm using the private key to obtain second data.
Operation 318

END

FIG. 3B

SECURING DATA SENT BETWEEN COMPUTING DEVICES

FIELD

Embodiments disclosed herein relate generally to securing data. More particularly, embodiments disclosed herein relate to securing data sent between computing devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3B show flow diagrams illustrating methods in accordance with an embodiment.

DETAILED DESCRIPTION

Figure 1:
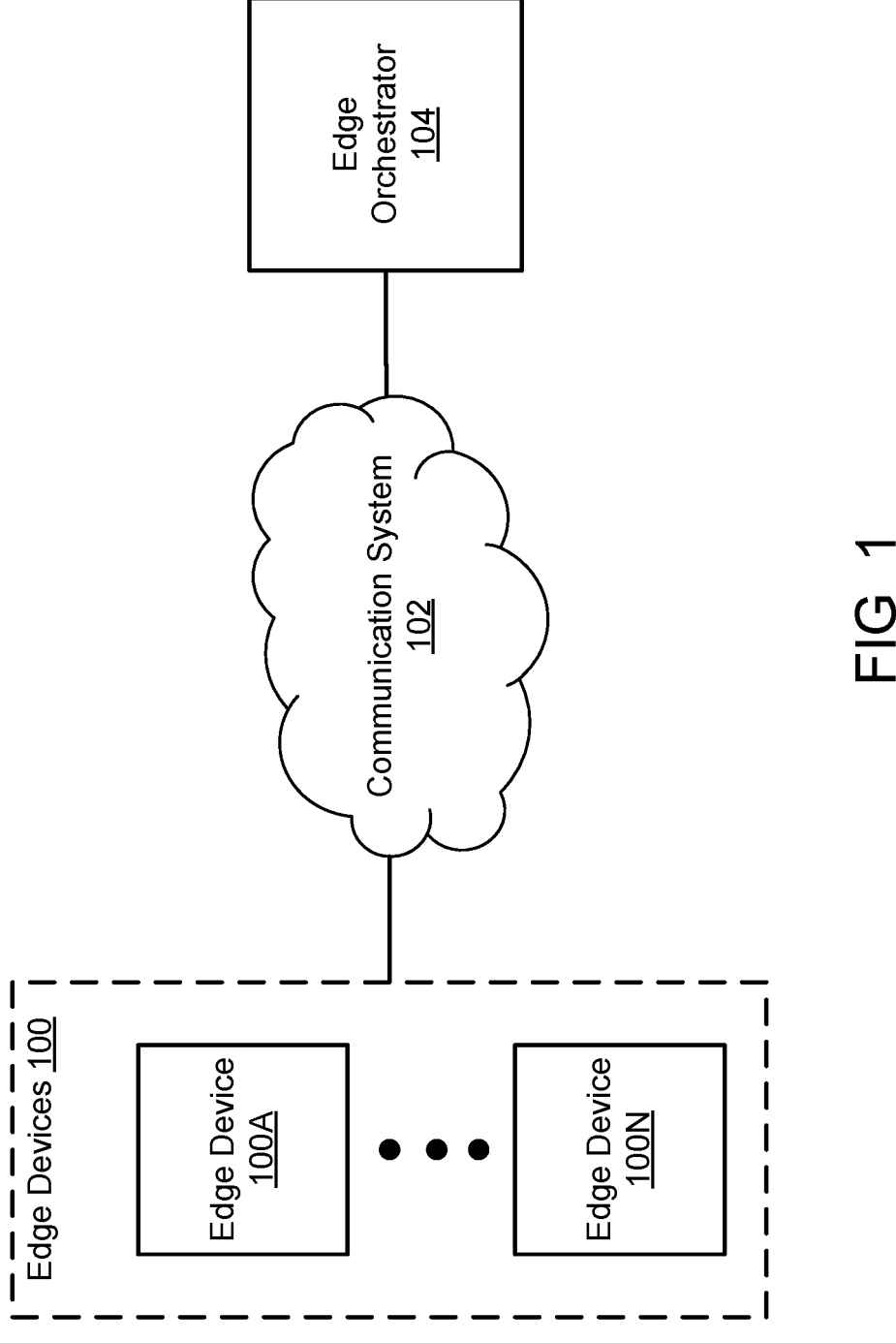
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing data sent between edge devices. Data may be secured by implementation of attributes that are used to select an encryption algorithm. The attributes may include identifier of the sending edge device, identifier of the receiving edge device, classification of the data, and progressive rules that depend on time.

Selection of the encryption algorithm by the implementation of the attributes may reinforce security of the data between the sending edge device and the receiving edge device. As the attributes may change with different attributes, the encryption algorithm may change. As the encryption algorithm changes, determination of the encryption algorithm may become harder for a third party or malicious actor.

In an embodiment, a method for securing data is provided. The method may include: (i) obtaining, by a first edge device, the data for encryption by the first edge device; (ii) obtaining, by the first edge device and from an edge orchestrator, first progressive rules based on a first time from a global time standard and on classifications of data sensitivity; (iii) obtaining, by the first edge device, a classification of sensitivity of the data; (iv) selecting, by the first edge device, an encryption algorithm and a public key based at least in part on the classification of the sensitivity of the data and using the progressive rules; (v) encrypting, by the first edge device, the data with the encryption algorithm using the public key to obtain encrypted data; and (vi) sending, by the first edge device, the encrypted data and the classification to a second edge device.

The method may further include obtaining, by the first edge device and from the edge orchestrator, second progressive rules based on a second time from the global time standard and on the classifications of data sensitivity.

The first progressive rules and the second progressive rules indicate different encryption algorithms are to be used while each of the progressive rules are in force, and each of the progressive rules being in force during different periods of time.

Selecting the encryption algorithm and the public key may include (i) obtaining an identifier of the first edge device; (ii) obtaining an identifier of the second edge device; and (iii) performing a lookup in the progressive rules using the identifier of the first edge device, the identifier of the second edge device, and the classification to obtain an identifier of the encryption algorithm and an identifier of the public key.

Encrypting the data may include (i) configuring an encryption application to perform the encryption algorithm using the identifier of the encryption algorithm to obtain a configured encryption application; and (ii) ingesting the data and the public key into the configured encryption application using the identifier of the public key to obtain the encrypted data.

The method may further include (i) obtaining, by the first edge device and from another edge device, second encrypted data and a second classification; (ii) obtaining, by the first edge device and from the edge orchestrator, second progressive rules based on a second time from the global time standard and on the classifications of the data sensitivity; (iii) selecting, by the first edge device, a decryption algorithm and a private key based at least in part on the second classification using the second progressive rules; and (iv) decrypting, by the first edge device, the second encrypted data with the decryption algorithm using the private key to obtain second data.

The method may further include providing, by the first edge device, computer implemented services using the second data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide computer implemented services, the system of FIG. 1 may include edge devices 100. Edge devices 100 may perform operations, that may include (i) generation of data, (ii) communication with other devices and with other edge devices, and (iii) monitoring and troubleshooting processes. Data may be generated by edge devices 100 as a result of executing software and/or processes. The data may be passed between other devices of edge devices 100 and used by other software and/or processes.

In passing data between edge devices of edge devices 100, edge devices 100 may distribute the data via communications. The data from a first edge device may include messages, diagnostics, and/or statistics to be received by a second edge device. The messages, diagnostics, and/or statistics may be processed by the second edge device to perform computer implemented services.

In sending data between edge devices 100, edge devices 100 may encrypt data to prevent compromise by a third party such as malicious actor. The data being sent from the first edge device may be encrypted with a public key. After the data is sent to the second edge device, the second edge device may obtain a private key, for example from a key repository in edge orchestrator 104, corresponding to a public key from the first edge device. The public key may be used to decrypt the data sent from the first edge device. It will be appreciated that symmetric keys may be used without departing from embodiments disclosed herein for encryption/decryption purposes.

Encrypted data transmitted between the first and second edge devices may be subject to compromise by the third party or the malicious actor through monitoring of the transmission. By monitoring the transmissions, the third party or the malicious actor may learn the encryption mechanism by which data is encrypted. Through learning the encryption mechanism, the data transmitted may be compromised.

In general, embodiments disclosed here relate to systems and methods for securing data. The data may be secured by enforcing a security framework. The security framework may require that transmitted data may be secured using a diverse set of encryption schemes (e.g., algorithms used, keys used in the encryption process, etc.). The encryption scheme that is used on the data may depend on (i) a sender of the data, (ii) a receiver of the data, (iii) a classification (e.g., sensitivity classification or other type of classification) of the data, and/or (iv) a set of progressive rules that indicate which encryption scheme is to be used based on the aforementioned information (e.g., sender/receiver/data classification).

Figure 2A:
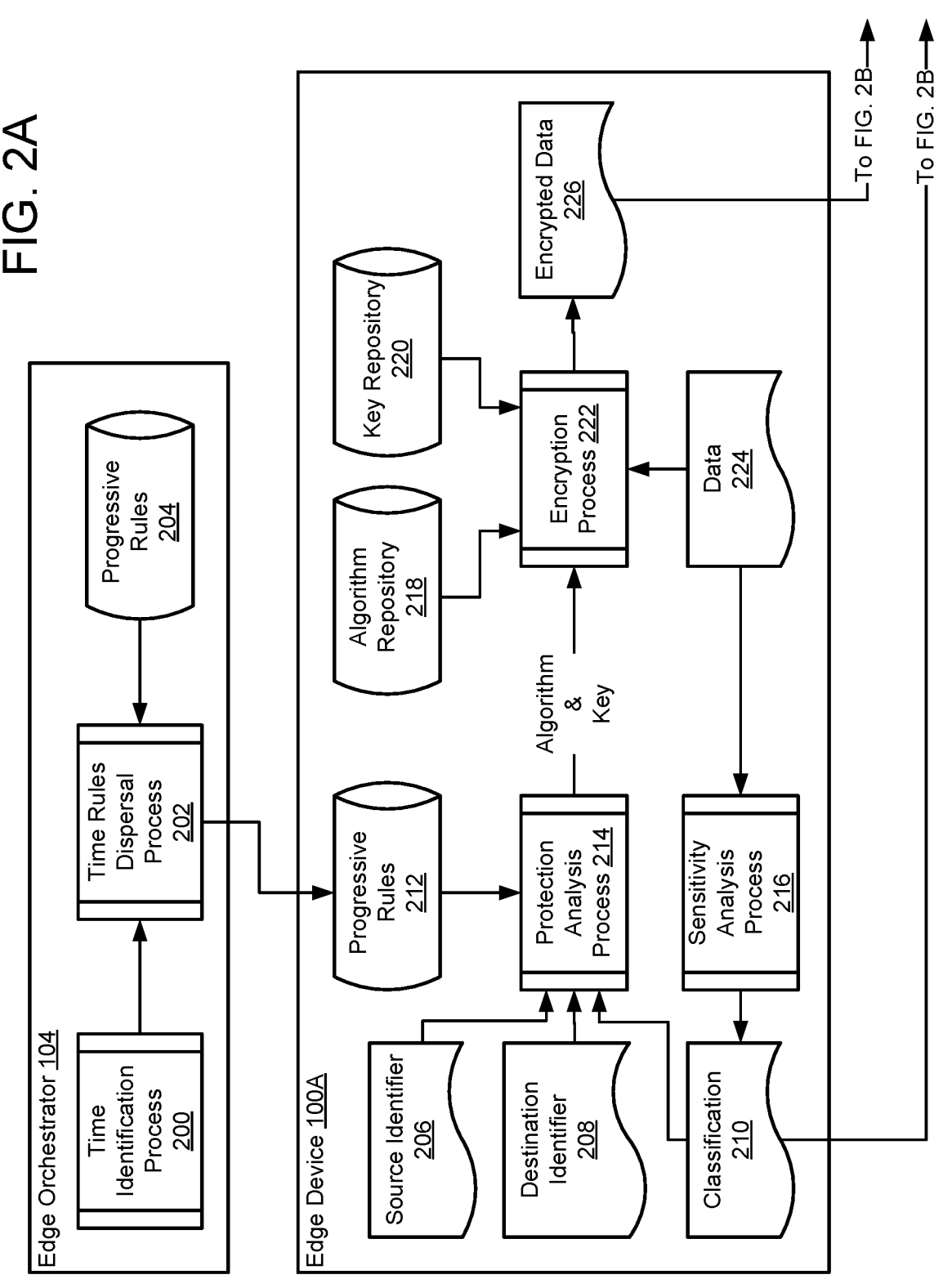
FIG. 2A-2B shows data flow diagrams illustrating operation of a system in accordance with an embodiment.

To transmit data, the data may initially be classified. Once classified, the progressively rules may be used to identify an encryption scheme to be used to secure the data during transmission to a receiving device. The data may then be encrypted and sent to a receiver along with the classification used to select the encryption scheme. Refer to FIG. 2A for additional details regarding secure transmission of data through encryption using a diverse set of encryption schemes.

Figure 2B:
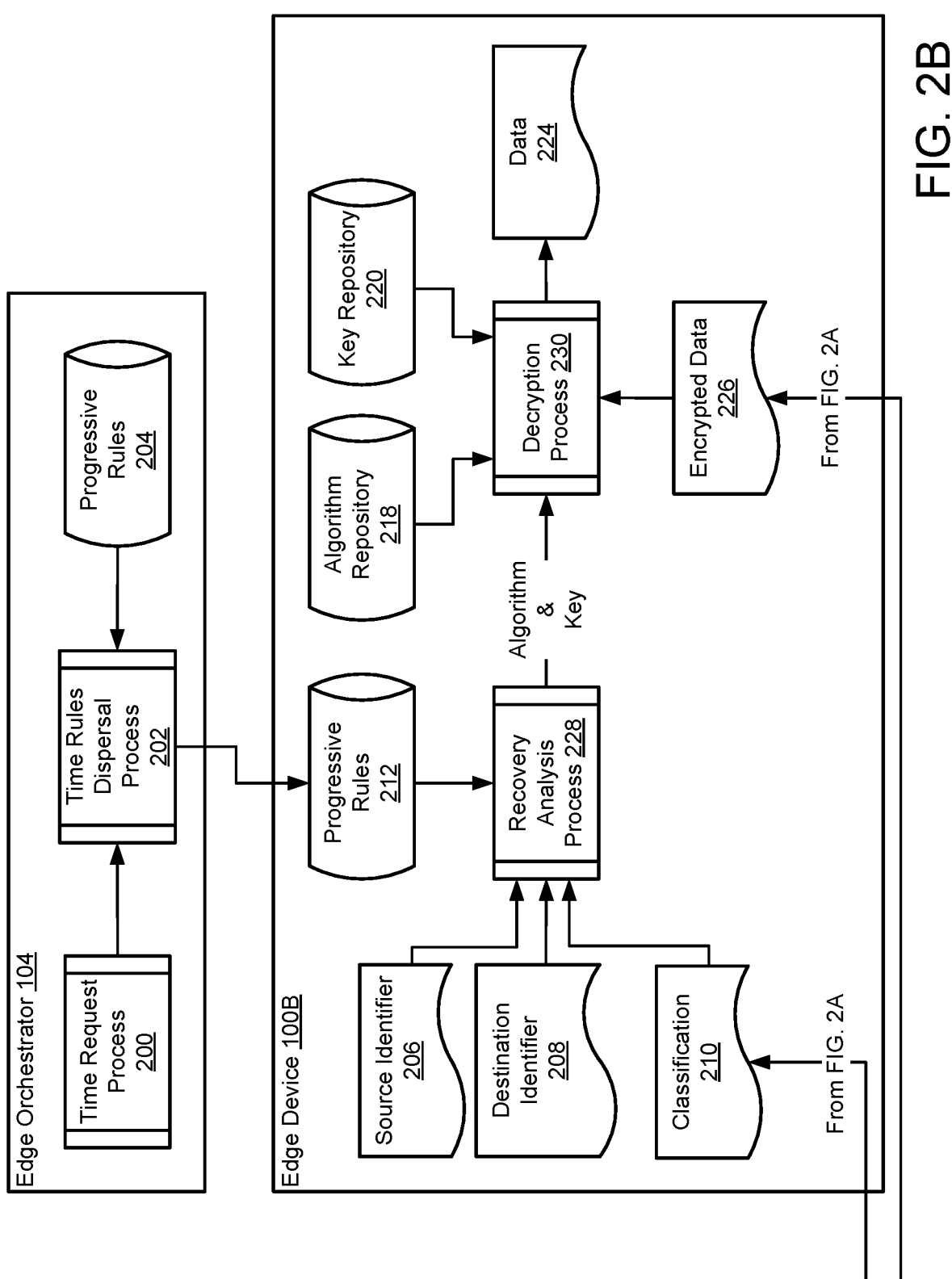

When encrypted data is received, the corresponding classification may be used to identify the encryption scheme used to encrypt the data. The sender, the receiver, the classification of the data, and the set of progressive rules may be used to determine which encryption scheme was used to encrypt the encrypted data. Once the encryption algorithm is identified, the encrypted data may be decrypted using a corresponding decryption scheme (e.g., decryption algorithm, private key, etc.) to use to decrypt the data. The encrypted data may then be decrypted. Refer to FIG. 2B for additional details regarding decrypting data.

To provide the above noted functionality, the system may include edge devices 100, and edge orchestrator 104. Each of these components is discussed below.

Edge devices 100 may include any number of edge device 100A-100N. Edge device 100A-100N may provide computer implemented services. To provide the computer implemented services, edge devices 100 may transmit data to other devices. To secure the transmitted data, edge devices 100 may enforce the security framework by conditioning the encryption scheme utilized based on the time at which the data is transmitted, the sending/receiving devices, the classification (e.g., sensitivity classification) for the data, and/or other factors. By doing so, data transmitted within a distributed system may be secured using a diverse set of encryption schemes that reduces the likelihood of the encryption schemes being overcome and the transmitted data being compromised.

Edge orchestrator 104 may facilitate implementation of the security framework by (i) generating progressively rules, and (ii) distributing the progressive rules to edge devices 100. The progressively rules may be updated overtime so that different rules are applied over time. The rules may indicate which encryption scheme is to be used for transmission of data.

When providing their functionality, any of (and/or components thereof) edge devices 100 and edge orchestrator 104 may perform all, or a portion, of the actions and methods illustrated in FIGS. 2A-3B.

Any of (and/or components thereof) edge devices 100 and edge orchestrator 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may secure data by regulating selection of an encryption algorithm for the data when sending the data from a first edge device to a second edge device.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 206, 208, etc.) is used to represent data structures, a second set of shapes (e.g., 200, 202, etc.) is used to represent processes performed using and/or that generate data, and a third set of shapes (e.g., 204, 212, etc.) is used to represent large scale data structures such as databases.

Turning to FIG. 2A, a first data flow diagram in accordance with an embodiment is shown. The first data flow diagram may illustrate data used in and data processing performed in encryption of data by a first edge device.

Edge device 100A may hold data 224 and may plan to send the data to edge device 100B (e.g., shown in FIG. 2B). Data 224 may include, for example, one or more messages, diagnostic data regarding edge device 100A, statistical information regarding the operation of edge device 100A, and/or other types of information that may be used for various purposes.

To prepare to send data 224 to edge device 100B, sensitivity analysis process 216 may be performed to obtain classification 210. During sensitivity analysis process 216, data 224 may be ingested and analyzed to ascribe a level of sensitivity to data 224. Sensitivity analysis process 216 may utilize a set of rules, an inference model, and/or other modalities for classifying the sensitivity level of data 224. Classification 210 may label (and/or otherwise ascribe) a level of sensitivity to data 224.

Once classification 210 is obtained, protection analysis process 214 may be performed. During protection analysis process 214, classification 210, source identifier 206, and destination identifier 208 may be used to identify an encryption algorithm and a key (e.g., an encryption scheme) to be used to encrypt data 224. Source identifier 206 may identify edge device 100A, which may send data 224. Destination identifier 208 may identify edge device 100B, which may receive data 224.

To identify the encryption scheme to use, source identifier 206, destination identifier 208, and classification 210 may be used to perform a lookup in progressive rules. Progressive rules 212 may include a regularly updated set of encryption schemes from edge orchestrator 104. Progressive rules 212 may associate different encryption schemes with different source identifiers, destination identifiers, and classifications.

The associations defined by progressively rules 212 may be updated over time to cause encryption schemes used to transmit data to change over time. For example, time rules dispersal process 202 may update different sets of progressive rules 204 based on the current time (e.g., obtained from time identification process 200).

Time identification process 200 may obtain and provide the current time based on requests for the current time. The current time may be used in time rules dispersal process 202. Time rules dispersal process 202 may extract encryption schemes from progressive rules 204 and update the association to corresponding identifiers and classifications them based on the current time to obtain progressive rules 212. The resulting progressive rules 212 may be provided to edge device 100A. The aforementioned progress by edge orchestrator 104 may be performed over time thereby causing the encryption schemes used to encrypt data to change over time.

Accordingly, when source identifier 206, destination identifier 208, and classification 210 is used to perform a lookup in progressive rules 212, a corresponding encryption algorithm and public key with which to encrypt data 224 may be obtained. For example, the lookup may return an identifier of the encryption algorithm and/or the public key to use.

Once obtained the encryption algorithm is identified, the encryption algorithm may be obtained from algorithm repository 218 and a public key may be obtained from key repository 220. The encryption algorithm and public key may be used in encryption process 222 to encrypt data 224. Encryption process 222 may produce encrypted data 226. Encrypted data 226 and classification 210 may be sent to edge device 100B, as shown in FIG. 2B.

Thus, using the data flow diagram shown in FIG. 2A, embodiments disclosed herein may improve the security of data by dynamically adjusting the manner in which data is encrypted prior to transmission over time.

Turning to FIG. 2B, a second data flow diagram in accordance with an embodiment is shown. The second data flow diagram may illustrate data used in and data processing performed in decryption of encrypted data by a second edge device.

To enable the encrypted data to be decrypted, encrypted data 226 and classification 210 may be provided by a first edge device, e.g., edge device 100A as discussed with respect to FIG. 2A, and to a second edge device, edge device 100B shown in FIG. 2B. The second edge device may use classification 210 along with source identifier 206 and destination identifier 208 to determine which encryption scheme was used to obtain encrypted data 226.

To identify the encryption algorithm, recovery analysis process 228 may be performed. During recovery analysis process 228, source identifier 208, destination identifier 208, classification 210, and progressive rules 212 may be ingested (e.g., similarly to protection analysis process 214). Recovery analysis process 228 may rely on the same progressive rules (e.g., 212) used in protection analysis process 214 as well as the same data to perform a similar lookup to identify the encryption scheme used to obtain encrypted data 226.

Using a corresponding recovery algorithm and private key (e.g., complementary to the encryption algorithm and public key used to encrypt encrypted data 226), data 224 may be recovered.

For example, decryption process 230 be performed using the identified algorithm and key. During decryption process 230, the decryption algorithm and the private key may be obtained from algorithm repository 218 and key repository 220, respectively. Once obtained, decryption process 230 may use the private key and the recovery algorithm to decrypt encrypted data 226 to obtain data 224.

Thus, using the interaction diagram shown in FIG. 2B, embodiments disclosed herein may illustrate decryption of data by a second edge device.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes.

For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
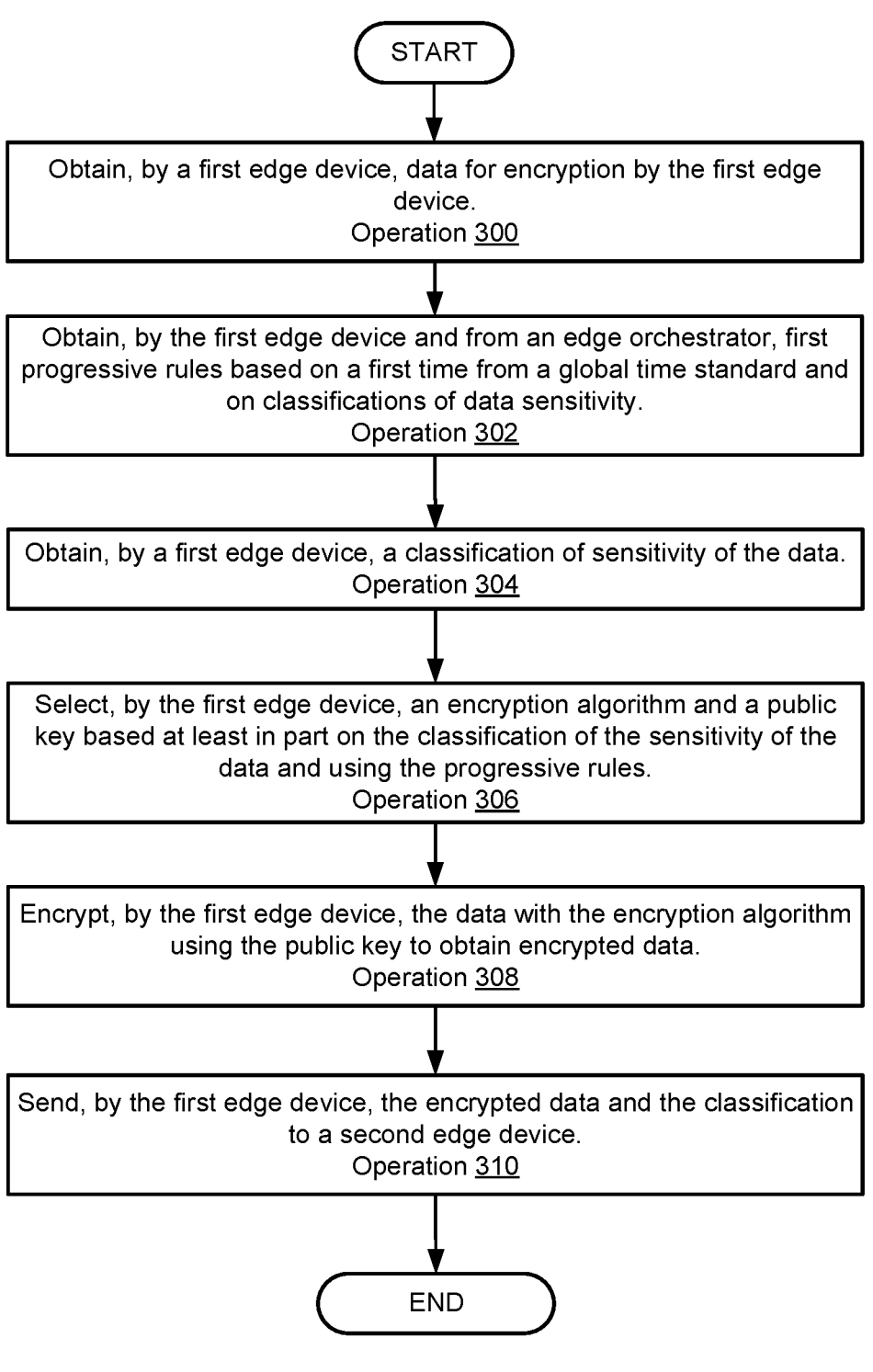

As discussed above, the components of FIG. 1 may perform various methods to store data in distributed systems using a distributed deduplication framework. FIG. 3A-3B illustrate methods that may be performed by the components of the system of FIG. 1. In the diagrams discussed below and shown in FIG. 3A-3B, any of the operations may be repeated, performed in different orders, and/or performed in parallel with or in a partially overlapping in time manner with other operations.

Turning to FIG. 3A, a first flow diagram illustrating a method of securing data in accordance with an embodiment is shown. The method may be performed, for example, by any of the components of the system of FIG. 1, and/or other components not shown therein.

At operation 300, data may be obtained by a first edge device for encryption by the first edge device. The data may be obtained by generating the data or receiving the data by the first edge device.

At operation 302, first progressive rules may be obtained, by the first edge device and from an edge orchestrator, based on a first time from a global time standard and on classifications of data sensitivity. The first progressive rules may be obtained by receiving the first progressive rules from the edge orchestrator.

At operation 304, a classification of sensitivity of the data may be obtained by the first edge device. The classification of the sensitivity of the data may be obtained by assessing, by the first edge device, importance of the data and classifying the data based on the importance of the data.

At operation 306, an encryption algorithm and a public key may be selected, by the first edge device, based at least in part on the classification of the sensitivity of the data and using the progressive rules. An encryption algorithm and a public key may be selected by (i) obtaining an identifier of the first edge device, (ii) obtaining an identifier of the second edge device, and (iii) performing a lookup in the progressive rules using the identifier of the first edge device, the identifier of the second edge device, and the classification to obtain an identifier of the encryption algorithm and an identifier of the public key.

The identifier of the first edge device may be obtained by reading identification information from the first edge device. The identifier of the second edge device may be obtained by reading identification information from the second edge device. A lookup in the progressive rules to obtain an identifier of the encryption algorithm and an identifier of the public key may be performed by accessing a repository of the progressive rules and retrieving the identifier for the encryption algorithm from an algorithm repository and retrieving the identifier of the public key from a key repository.

At operation 308, the data may be encrypted, by the first edge device, with the encryption algorithm using the public key to obtain encrypted data. The data may be encrypted by (i) configuring an encryption application to perform the encryption algorithm using the identifier of the encryption algorithm to obtain a configured encryption application; and (ii) ingesting the data and the public key into the configured encryption application using the identifier of the public key to obtain the encrypted data.

The encryption application may be configured to perform the encryption algorithm by having the encryption application select the encryption algorithm based on the identifier of the encryption algorithm. The data and the public key may be ingested into the configured application by using the identifier of the public key to access the public key from a key repository to sign the data after the data has been encrypted by the encryption algorithm.

At operation 310, the encrypted data and the classification may be sent, by the first edge device, to the second edge device. The encrypted data and the classification may be sent by transmitting the encrypted data and the classification through a wired or wireless interface from the first edge device to the second edge device.

The method may end following operation 310.

Turning to FIG. 3B, a second flow diagram illustrating a method of securing data in accordance with an embodiment is shown. The method may be performed, for example, by any of the components of the system of FIG. 1, and/or other components not shown therein.

At operation 312, second encrypted data and a second classification may be obtained by the first device and from another edge device. The second encrypted data and the second classification may be obtained by sending the second encrypted data and the second classification from the other edge device to the first edge device.

At operation 314, second progressive rules may be obtained, by the first edge device and from the edge orchestrator, based on a second time from a global time standard and on the classifications of data sensitivity. The second progressive rules may be obtained by receiving the second progressive rules from the edge orchestrator.

At operation 316, a decryption algorithm and a private key may be selected, by the first edge device, based at least in part on the second classification using the second progressive rules. The decryption algorithm and the private key may be selected by (i) obtaining an identifier of the first edge device, (ii) obtaining an identifier of the other edge device, and (iii) performing a lookup in the second progressive rules using the identifier of the first edge device, the identifier of the other edge device, and the second classification to obtain an identifier of the decryption algorithm and an identifier of the public key. The identifier of the decryption algorithm may be used to select the decryption algorithm from an algorithm repository. The identifier of the private key may be used to select the private key from a key repository, which pairs with the public key signature on the encrypted data.

At operation 318, the second decrypted data may be decrypted, by the first edge device, with the decryption algorithm using the private key to obtain second data. The second decrypted data may be decrypted by (i) ensuring the private key pairs with the public key signature on the second encrypted data and then (ii) implementing the decryption algorithm to decrypt the second decrypted data.

The method may end following operation 318.

Figure 4:
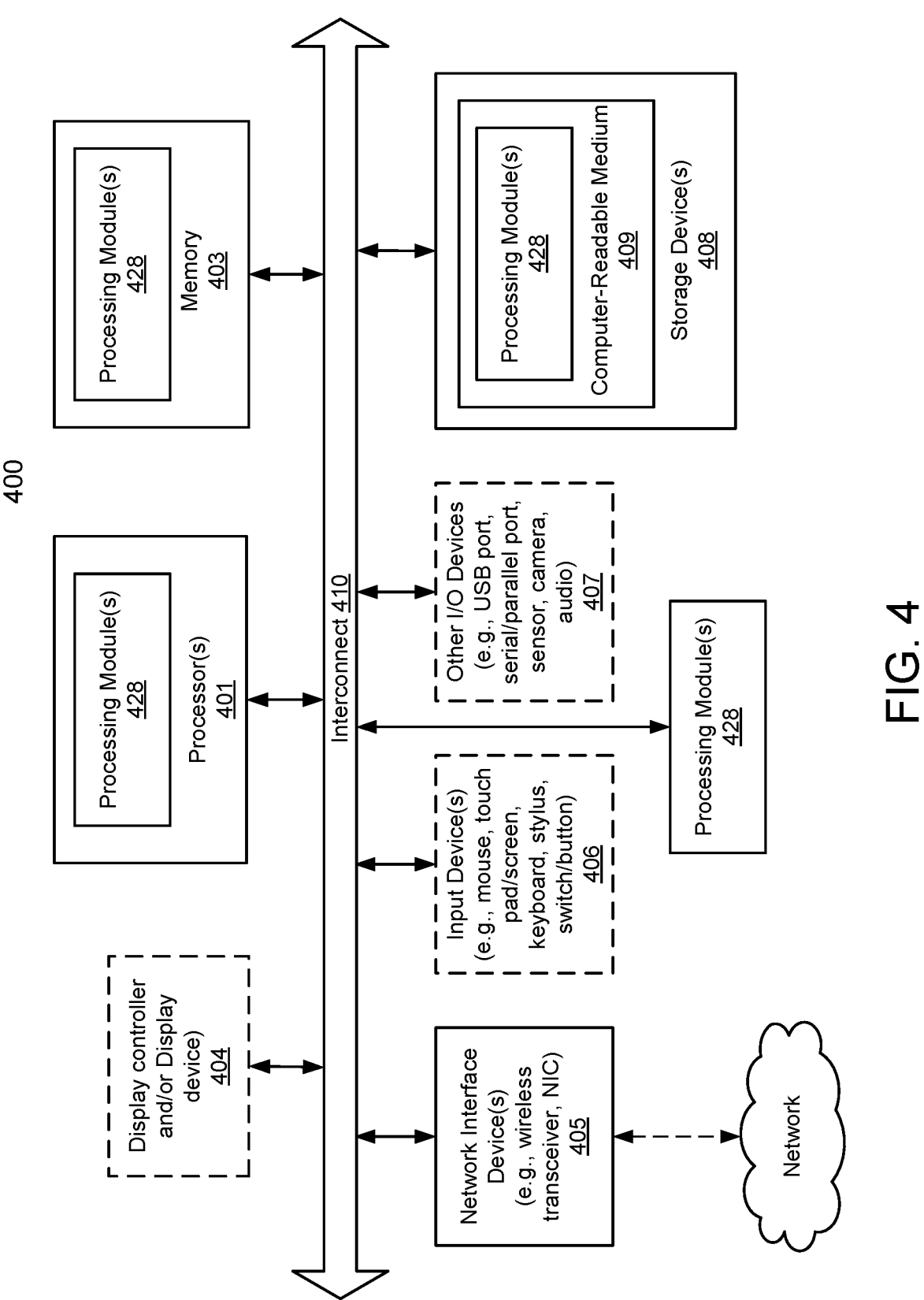
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing data, the method comprising:

obtaining, by a first edge device, the data for encryption by the first edge device;

obtaining, by the first edge device and from an edge orchestrator, first progressive rules that are regularly updated, the first progressive rules being determined based on a first current time from a global time standard and on classifications of data sensitivity;

obtaining, by the first edge device, a classification of sensitivity of the data;

selecting, by the first edge device, an encryption algorithm and a public key based at least in part on the classification of the sensitivity of the data and using the first progressive rules;

encrypting, by the first edge device, the data with the encryption algorithm using the public key to obtain encrypted data;

sending, by the first edge device, the encrypted data and the classification to a second edge device;

obtaining, by the first edge device and from another edge device, second encrypted data and a second classification;

obtaining, by the first edge device and from the edge orchestrator, second progressive rules based on a second current time from the global time standard and on the classifications of data sensitivity;

selecting, by the first edge device, a decryption algorithm and a private key based at least in part on the second classification using the second progressive rules; and decrypting, by the first edge device, the second encrypted data with the decryption algorithm using the private key to obtain second data.

2. The method of claim 1, wherein the first progressive rules and the second progressive rules indicate different encryption algorithms are to be used while the first progressive rules and second progressive rules are in force, and the first progressive rules and second progressive rules being in force during different periods of time.

3. The method of claim 2, further comprising:

providing, by the first edge device, computer implemented services using the second data.

4. The method of claim 1, wherein selecting the encryption algorithm and the public key comprises:

obtaining an identifier of the first edge device;

obtaining an identifier of the second edge device; and performing a lookup in the first progressive rules using the identifier of the first edge device, the identifier of the second edge device, and the classification to obtain an identifier of the encryption algorithm and an identifier of the public key.

5. The method of claim 4, wherein encrypting the data comprises:

configuring an encryption application to perform the encryption algorithm using the identifier of the encryption algorithm to obtain a configured encryption application; and ingesting the data and the public key into the configured encryption application using the identifier of the public key to obtain the encrypted data.

6. The method of claim 4, further comprising:

providing, by the first edge device, computer implemented services using the second data.

7. The method of claim 1, further comprising:

providing, by the first edge device, computer implemented services using the second data.

8. A non-transitory machine-readable medium having instructions stored therein, which when executed by a processor, cause the processor to perform operations for securing data, the operations comprising:

obtaining, by a first edge device, the data for encryption by the first edge device;

obtaining, by the first edge device and from an edge orchestrator, first progressive rules based on a first current time from a global time standard and on classifications of data sensitivity;

obtaining, by the first edge device, a classification of sensitivity of the data;

selecting, by the first edge device, an encryption algorithm and a public key based at least in part on the classification of the sensitivity of the data and using the first progressive rules;

encrypting, by the first edge device, the data with the encryption algorithm using the public key to obtain encrypted data; and sending, by the first edge device, the encrypted data and the classification to a second edge device;

obtaining, by the first edge device and from another edge device, second encrypted data and a second classification;

obtaining, by the first edge device and from the edge orchestrator, second progressive rules based on a second current time from the global time standard and on the classifications of data sensitivity;

selecting, by the first edge device, a decryption algorithm and a private key based at least in part on the second classification using the second progressive rules; and decrypting, by the first edge device, the second encrypted data with the decryption algorithm using the private key to obtain second data.

9. The non-transitory machine-readable medium of claim 8, wherein the first progressive rules and the second progressive rules indicate different encryption algorithms are to be used while the first progressive rules and second progressive rules are in force, and the first progressive rules and second progressive rules being in force during different periods of time.

10. The non-transitory machine-readable medium of claim 9, the operations further comprising:

providing, by the first edge device, computer implemented services using the second data.

11. The non-transitory machine-readable medium of claim 8, wherein selecting the encryption algorithm and the public key comprises:

obtaining an identifier of the first edge device;

obtaining an identifier of the second edge device; and performing a lookup in the first progressive rules using the identifier of the first edge device, the identifier of the second edge device, and the classification to obtain an identifier of the encryption algorithm and an identifier of the public key.

12. The non-transitory machine-readable medium of claim 11, wherein encrypting the data comprises:

configuring an encryption application to perform the encryption algorithm using the identifier of the encryption algorithm to obtain a configured encryption application; and ingesting the data and the public key into the configured encryption application using the identifier of the public key to obtain the encrypted data.

13. The non-transitory machine-readable medium of claim 11, the operations further comprising:

providing, by the first edge device, computer implemented services using the second data.

14. The non-transitory machine-readable medium of claim 8, the operations further comprising:

providing, by the first edge device, computer implemented services using the second data.

15. A data processing system, comprising:

a processor; and a memory coupled to the processor to store instructions, which when executed by the processor, cause the processor to perform operations for securing data, the operations comprising:

obtaining, by a first edge device, the data for encryption by the first edge device;

obtaining, by the first edge device and from an edge orchestrator, first progressive rules based on a first current time from a global time standard and on classifications of data sensitivity;

obtaining, by the first edge device, a classification of sensitivity of the data;

selecting, by the first edge device, an encryption algorithm and a public key based at least in part on the classification of the sensitivity of the data and using the first progressive rules;

encrypting, by the first edge device, the data with the encryption algorithm using the public key to obtain encrypted data;

sending, by the first edge device, the encrypted data and the classification to a second edge device;

obtaining, by the first edge device and from another edge device, second encrypted data and a second classification;

obtaining, by the first edge device and from the edge orchestrator, second progressive rules based on a second current time from the global time standard and on the classifications of data sensitivity;

selecting, by the first edge device, a decryption algorithm and a private key based at least in part on the second classification using the second progressive rules; and decrypting, by the first edge device, the second encrypted data with the decryption algorithm using the private key to obtain second data.

16. The data processing system of claim 15, wherein the first progressive rules and the second progressive rules indicate different encryption algorithms are to be used while the first progressive rules and second progressive rules are in force, and the first progressive rules and second progressive rules being in force during different periods of time.

17. The data processing system of claim 16, the operations further comprising:

providing, by the first edge device, computer implemented services using the second data.

18. The data processing system of claim 15, wherein selecting the encryption algorithm and the public key comprises:

obtaining an identifier of the first edge device;

obtaining an identifier of the second edge device; and performing a lookup in the first progressive rules using the identifier of the first edge device, the identifier of the second edge device, and the classification to obtain an identifier of the encryption algorithm and an identifier of the public key.

19. The data processing system of claim 18, wherein encrypting the data comprises:

configuring an encryption application to perform the encryption algorithm using the identifier of the encryption algorithm to obtain a configured encryption application; and ingesting the data and the public key into the configured encryption application using the identifier of the public key to obtain the encrypted data.

20. The data processing system of claim 15, the operations further comprising:

providing, by the first edge device, computer implemented services using the second data.

* * * * *